July 21, 1970     J. A. MIX     3,521,595
SNOWMOBILE FOR TRAVEL ON WATER
Filed Jan. 23, 1969     3 Sheets-Sheet 1
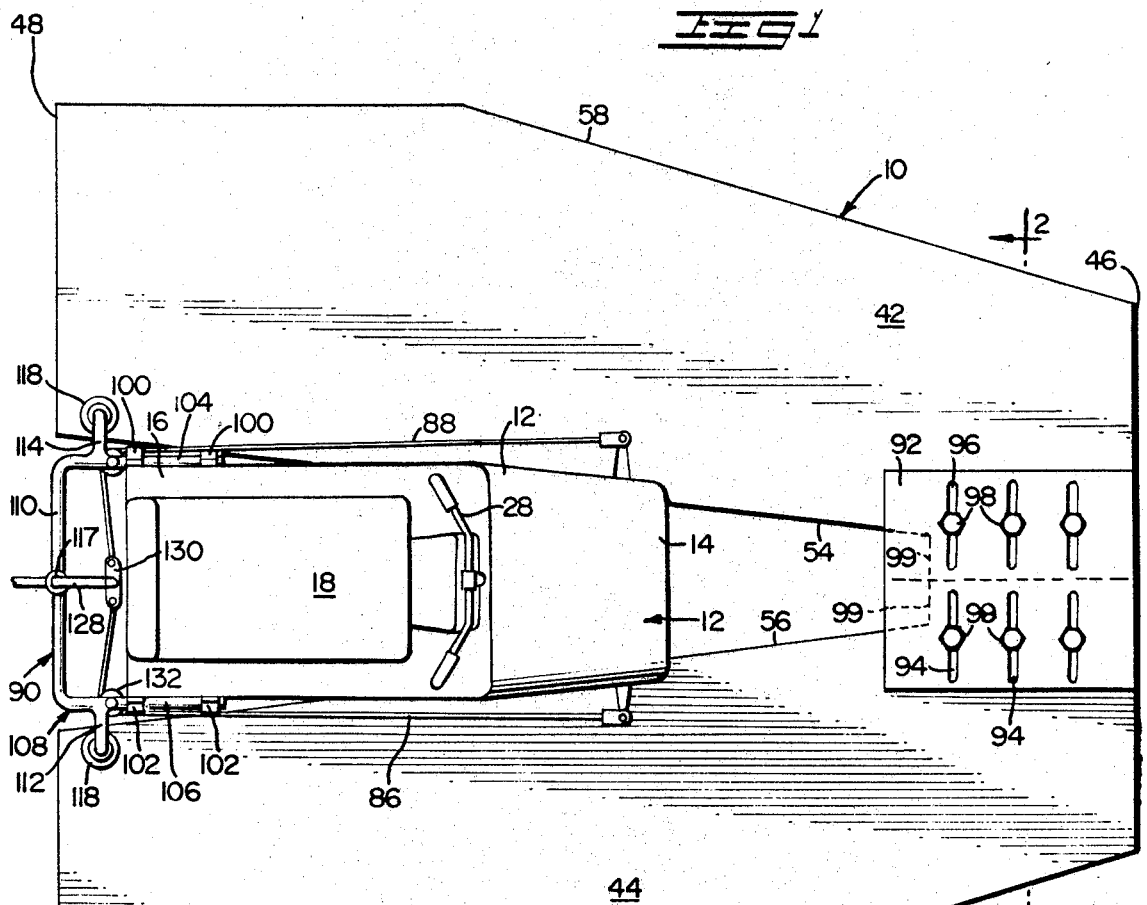
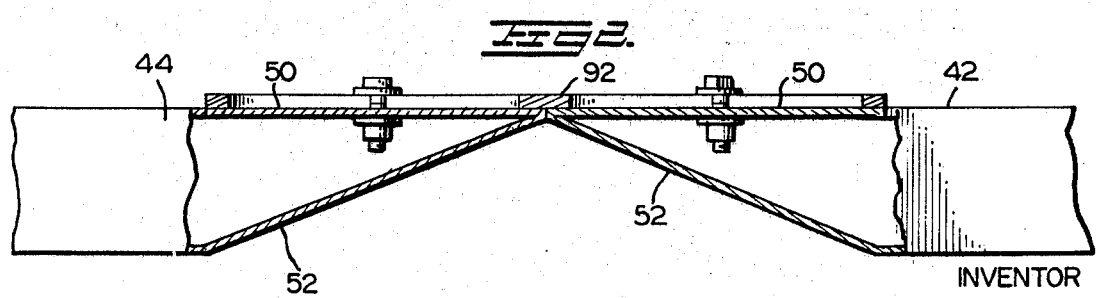
INVENTOR
JAMES A. MIX
Stowell & Stowell
ATTORNEYS

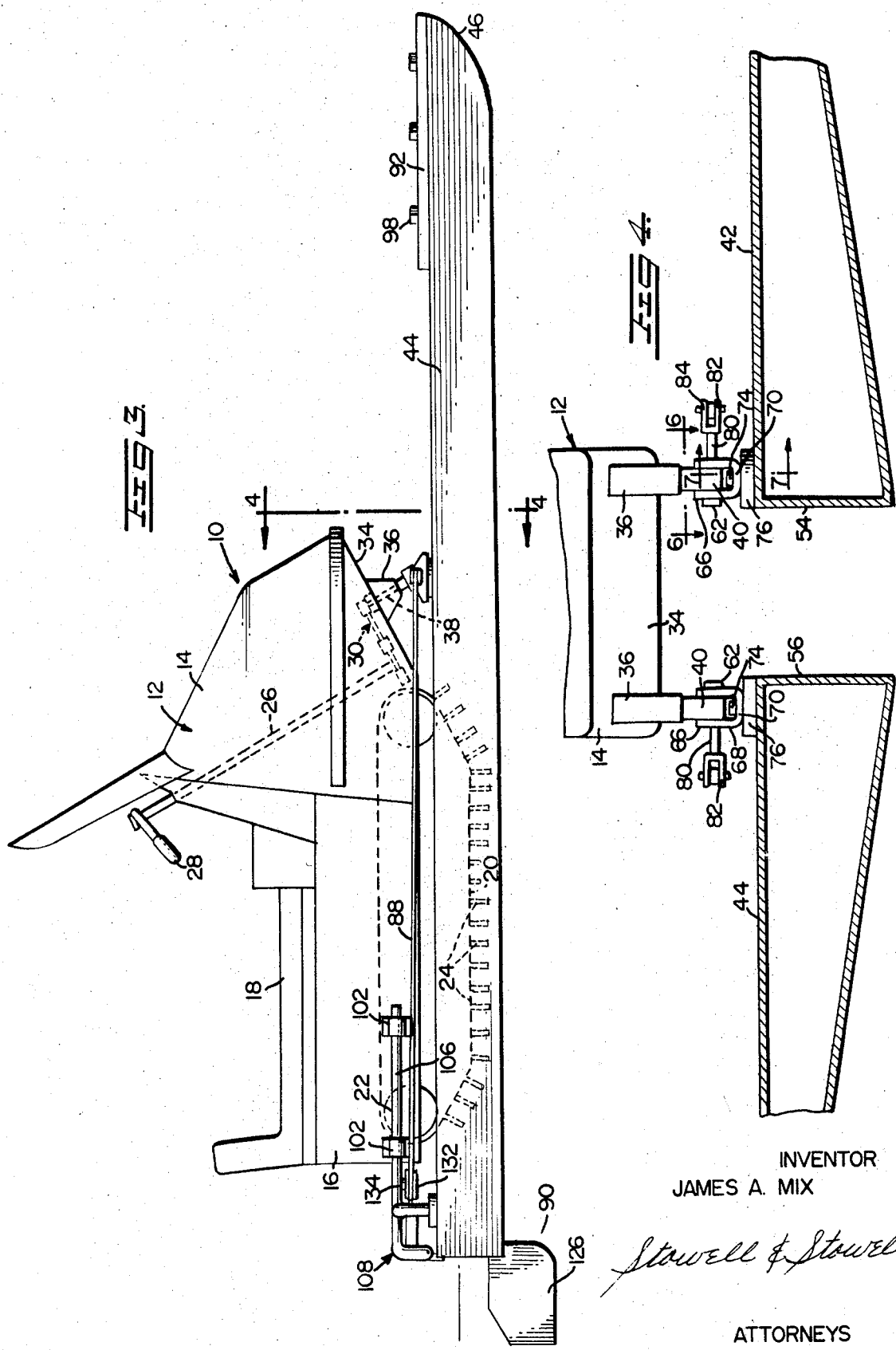

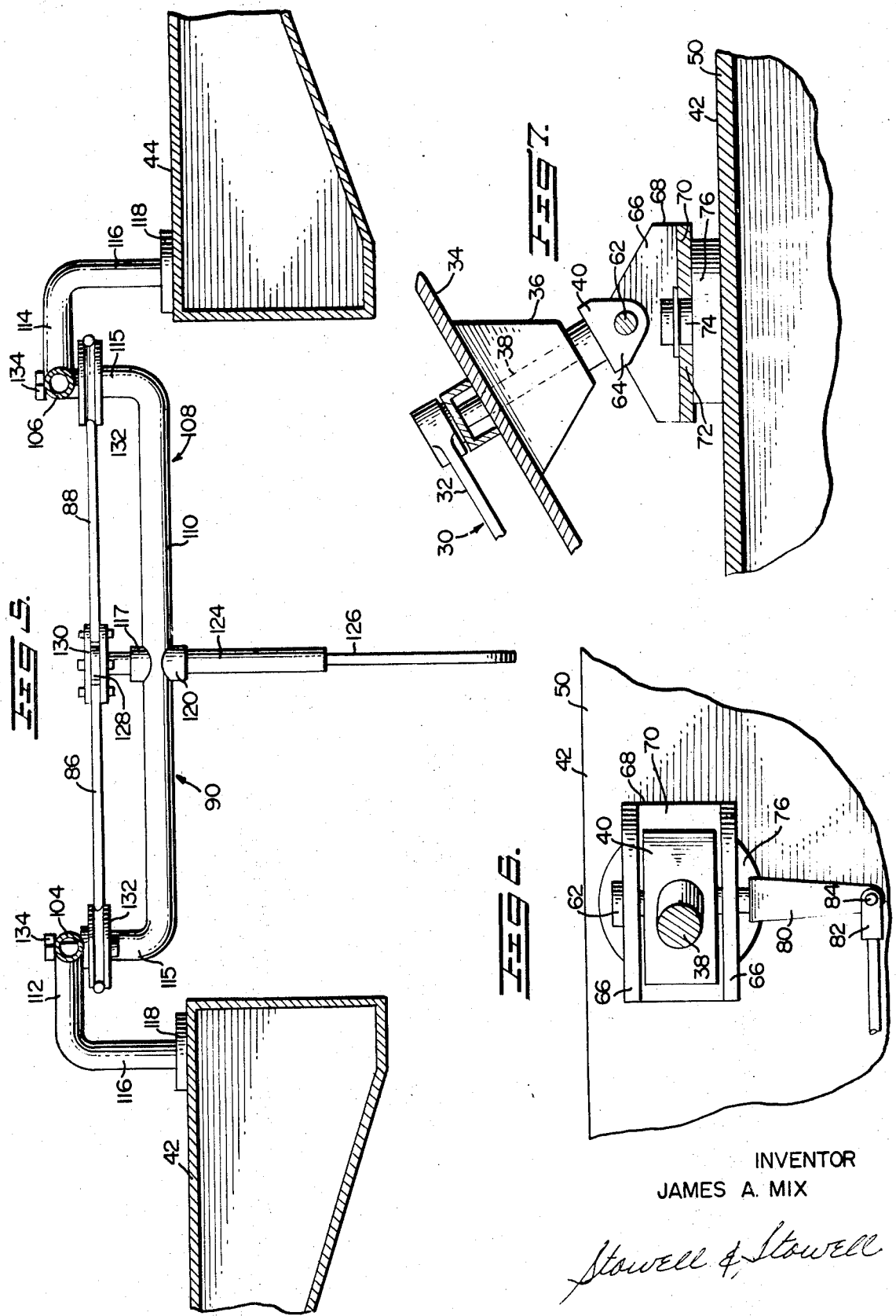

United States Patent Office 3,521,595
Patented July 21, 1970

3,521,595
SNOWMOBILE FOR TRAVEL ON WATER
James A. Mix, Longville, Minn. 56655
Filed Jan. 23, 1969, Ser. No. 793,451
Int. Cl. B60f 3/00
U.S. Cl. 115—1         10 Claims

ABSTRACT OF THE DISCLOSURE

The conversion of a conventional snowmobile into an aquatic vehicle for travel on water involving replacement of the steerable ground engaging snowskis with a buoyant supporting and steering arrangement including pontoons attached to the snowmobile body in the mounting manner and place of the snowskis and a rudder steering arrangement coupled to the steering linkage of the snowmobile with the poontoons being so related to the engine driven endless cleat track extending lengthwise under the body that the track functions in the water as the propulsion means.

BACKGROUND OF THE INVENTION

Field of the invention

The present invention generally relates to an occupant carrying motor vehicle for travel on water and more particularly is directed to new and novel means of a simple and dependable nature for converting a conventional snowmobile to an aquatic vehicle adapted to propel itself and an occupant operator on water.

Description of the prior art

Snowmobiles, for example, such as disclosed in U.S. Pat. 2,702,088, issued Feb. 15, 1955, have become extremely popular for winter travel and have been found to be a most efficient, practical and convenient automotive vehicle adapted to travel on snow and carry an occupant in an astride position on the body thereof at high speeds over snow-covered terrain. Such snowmobiles are of lightweight and durable construction and are easy to control and generally comprise a body upon which an occupant sits in an astride position and an engine mounted on the body with the engine driving an endless track that moves logitudinally of the bottom surface of the body and has cleats that grippingly engage the snow surface to propel the body over the snow-covered terrain. The body is supported and steered by means of outrigger skis with the skis being longitudinally disposed on opposite sides of the body in subjacent supporting relation thereto and being connected to a steering linkage that is controlled by a steering wheel mounted on a steering shaft and disposed in front of an occupant seated on the body.

By virtue of the very nature and the construction of such snowmobiles, they are movable only on snow-covered terrain and, therefore, the use and enjoyment thereof is limited to periods of the year when the ground is covered with snow or to certain geographical areas where snow abounds for long periods of time.

The primary object of the present invention is to broaden the usability of such snowmobiles and render them more versatile for year round use by enabling such snowmobiles, with a minimum of conversion materials and time required, to be used as aquatic automotive vehicles for travel on water.

Another important object of the present invention is to provide floating supporting members in the form of water pontoons that are adapted to be attached to the snowmobile body in the manner and in place of the conventional steering and snow engaging skis and to provide a rudder steering arrangement which is adapted to be coupled to the steering shaft by utilizing the same steering spindles that are conventionally provided for a snowmobile in connection with the steering of the snowskis and to utilize the endless cleat track as the propulsion means by disposing the pontoons in relation thereto so that the track engages the water in the manner of a long-running paddle-wheel.

Another important object of the present invention is to provide a conversion assembly which can be easily attached to a conventional snowmobile body in supporting substitution for the removed snowskis with no modification of the overall snowmobile body structure, internally or externally, being required and the engine drive and steering mechanisms and arrangements of the conventional snowmobile being utilized for propulsion and steering purposes when the vehicle is converted from a vehicle for travel on snow to a vehicle for travel on water.

SUMMARY OF THE INVENTION

The present invention primarily comprises a simple but most efficient structural conversion assemblage for converting a conventional snowmobile into an aquatic vehicle with a minimum of parts, expense and labor being required in effecting such conversion. The conventional snowmobile body, engine, and steering and propulsion components are utilized to advantage and for the same purposes in the conversion and use of the vehicle as a water vehicle with pontoons being attached to the snowmobile in the manner and place of the snowskis and with the steering shaft being utilized as the steering medium and a rudder being carried by an auxiliary supporting frame at the rear end of the snowmobile body, such frame being attached to the body of the snowmobile and the rudder being connected by cables to the steering linkage of the snowmobile. The pontoons are attached to the body of the snowmobile on opposite sides thereof and are formed so that the body is properly balanced and moves on the water with an even water displacement so that the aquatic vehicle rides and planes evenly and handles easily in the water. The propulsion cleat track of the snowmobile is utilized in the manner of a waterwheel or paddle and is disposed in relation to the supporting pontoons so that the same drive arrangement and power control means of the snowmobile are maintained and utilized for the vehicle in its converted aquatic condition. Thus, a very simple and efficient structural arrangement is provided for converting the vehicle from one use to the other while still maintaining all of the major integers of the vehicle and enabling the operation of the vehicle to be the same so that, for all practical purposes, a rider astride the body can drive and maneuver the vehicle, as an aquaticmobile, in the same manner that he would handle the vehicle when it is a snowmobile. Therefore, the advantages of maneuverability, efficient and effective operation, easy control and excellent riding and steering capacities are maintained and even enhanced.

BRIEF DESCRIPTION OF THE DRAWINGS

FIG. 1 is a top plan view of the occupant carrying and steered automotive vehicle of the present invention, which comprises a conventional snowmobile structurally modified essentially by the provision of pontoons and a rudder steering arrangement so that it is converted into an aquatic vehicle.

FIG. 2 is a transverse cross-sectional view, taken substantially on line 2—2 of FIG. 1, and illustrating in more detail the adjustable connection means between the adjoining front ends of the side pontoons with the pontoons being relatively laterally adjustable for accommodating snowmobile bodies of differing widths.

FIG. 3 is a side elevational view and shows more particularly the operating relationship between the propulsion cleat track and the pontoons and illustrates the steering arrangement and the rear mounting arrangement of the pontoons on the body.

FIG. 4 is a transverse vertical cross-sectional view taken substantially on line 4—4 of FIG. 3 and illustrates in more detail the steering arrangement.

FIG. 5 is a rear elevational view with the pontoons being shown in cross-section.

FIG. 6 is a detailed cross-sectional view of the connection of the snowmobile steering linkage to the rudder control and of the front mounting of the pontoons on the snowmobile body, such view taken substantially on line 6—6 of FIG. 4.

FIG. 7 is a detailed vertical sectional view taken substantially on line 7—7 of FIG. 4.

DESCRIPTION OF THE PREFERRED EMBODIMENT

Referring now more particularly to the accompanying drawings, and initially to FIGS. 1 and 3, the reference numeral 10 generally designates the aquatic automotive vehicle or aquaticmobile of the present invention, which is in essence an aquatically converted snowmobile of the overall conventional type, for example, such as shown in U.S. Pat. 2,702,088 and such as commercially manufactured by the Johnson Company.

Such conventional snowmobile essentially comprises a body 12 having a front end portion 14 and having a rear end portion 16 within which an automotive engine (not shown) is operatively mounted and which supports an occupant seat 18. The engine is adapted to drive an endless track 20 by means of rollers or sprockets 22, with the track 20 running longitudinally along the underside of the body and having its outer face provided with transverse cleats 24 that are longitudinally spaced on the track. A steering shaft 26 is rotatably positioned in the forward end portion 14 and terminates at its upper end in a steering bar arrangement 28 disposed immediately forward of the seat 18.

The lower end of the steering shaft 26 is connected to a steering linkage 30 which includes a pair of links 32, one being provided for each of the conventional snowskis. At laterally spaced apart points on the underside 34 of the front end portion 14 of the body, mounting blocks 36 are conventionally provided and spindles 38 are rotatably extended through the blocks and attached to the links 32 at their upper ends and have lower ends 40 to which the snowmobile skis are adapted to be attached by leaf spring connectors. Such latter assembly is well known and is not shown.

In accordance with the present invention, pontoons 42 and 44 are provided as water buoyant replacement elements for the snowskis. As shown in FIG. 1, the pontoons are disposed longitudinally on opposite sides of the body, with the pontoons being of hollow construction and formed of wood, fibreglass, or the like lightweight and buoyant but sturdy material. The pontoons have bow-like, tapered forward ends 46 and squared off aft ends 48 and have flat upper faces 50 and contoured lower faces 52. The opntoons are disposed on opposite sides of the body, and are, therefore, spaced laterally apart and have inner sides 54 and 56 which slightly taper outwardly from the front to the rear and have outer sides 58 and 60 which more progressively and distinctly flair outwardly and rearwardly so that the rear end portions of the pontoons are wider than the tapered front ends, such greater width-wise extent of the rear portions of the pontoons being desirable inasmuch as the rear end portion 16 of the body is heavier due to its function as an engine mount and enclosure and, therefore, there is greater water displacement at the rear end portion of the body 12 where the weight is. By having the pontoons of a greater width at the rear end portion and being progressively wider from the tapered front ends towards the squared off rear ends, the factor of the greater weight is taken into consideration and this enables the aquatic vehicle to ride evenly on the water, at all times. It also renders it more maneuverable and safer in its maneuvering and riding on the water.

The lower end portion 40 of each of the spindles 38 is attached by a large spindle bolt 62 disposed through a suitable transverse opening 64 therein to the apertured upstanding ears to flanges 66 of a U-shaped mounting plate 68. The end portion 40 is seated between the ears 66 and attached thereto by the spindle bolt 62. The web or bight portion 70 of each of the upstanding U-shaped plates 66 is provided with an opening 72 that receives an anchoring pin 74 upstanding from a fixed wear or bearing plate 76 which is suitably structurally fixed on the upper face of each of the pontoons.

In this manner, the mounting plates 66 are rotatable on the fixed bearing plates 76 which form a portion of the upper faces of each of the pontoons so that the steering linkage is carried through the spindles 38 to the plates 66 which are rotatable on the bearing supports arrangement. Also, by virtue of this construction, the pontoons are affixed at their forward end portions to the body 12 in subjacent supporting relationship thereto.

Obviously, it is an expedient matter to utilize the conventional steering and mounting assembly for the conventional snowskis (not shown) of the snowmobile, which includes the spindle rod assemblies. Normally, when the snowskis are attached, they are attached by a spindle bolt to the spindle 38 by a smaller spindle bolt than the bolt 62. In attaching the pontoons, the larger spindle bolt 62 is utilized and attached thereto is the U-shaped plate member 66 with the U-shaped plate member being rotatably mounted on and carried by the pontoons. The outer end of each of the spindle bolts 62 beyond the outer ear of each of the plate members 66 is provided with a steering link or arm 80 having a vertically apertured outer end to which a clevis 82 is connected by a vertical pin 84. Each clevis 82 constitutes the forward end of steering cables 86 and 88 which extend rearwardly along the sides of the body 12 to a rudder arrangement 90 disposed immediately but spacedly rearwardly of the rear end of the body 12 and in alignment with the longitudinal center line of the body 12.

The forward end portions of the pontoons are adjustably connected together by means of a bridging plate 92, which is formed with two longitudinal series of transverse slots 94 and 96 that are adapted to receive bolt assemblies 98. By virtue of the slots in the plates, the bolts 98, which are disposed through suitable openings in the upper faces of the pontoons, enable the plate to be adjusted so as to spread the pontoons further apart or move them closer together at their adjoining forward end portions in front of the front end portion 14 of the body 12. Such forward end portions have laterally inturned or offset portions 99 which complement each other in forming a common bow pontoon front end in advance of the front end of the body 12. The adjustable bridging or connecting plate permits the front ends of the pontoons to be adjusted laterally relative to each other so as to accommodate bodies 12 of varying widths. It will also be noted, particularly from FIG. 2, that the lower surfaces of the pontoons, below the plate 92, are curved to provide a channel for water flowing to the endless tracks 20.

The rear end portion of the body on each of its opposite sides is provided with mounting collars 100 and 102 within which the legs 104 and 106 of a U-shaped frame 108 are fixedly located with the web or bight portion 110 disposed transversely of the rear end of the body and spaced longitudinally rearwardly therefrom, as shown in FIG. 1.

The legs 104 and 106 of the U-shaped frame are provided with lateral extensions 112 and 114 which terminate in downward end portions 116 that have enlarged carrying or mounting feet 118 suitably anchored to the upper faces of the pontoons adjacent the rearward end portion and the inner side thereof, as shown in FIGS. 1 and 3.

As shown in FIG. 5, the bight portion 110 of the frame 108 is downturned from the leg portions 104 and 106 and lies in a horizontal plane therebelow and is connected to the rear ends thereof by vertical connecting portions or arms 115. The bight portion 110 is formed with a vertical opening midway between its ends and cylindrical housing 120 within which a cylindrical mounting and control rod 124 of a rudder 126 is journalled for rotation.

The upper end of the cylindrical control and mounting rod 124 is provided with a lateral, forwardly projecting arm 128 that carries transverse links 130. The opposing end portions of the links are attached by suitable connectors to the rear ends of the cables 86 and 88, with the cables being entrained over horizontally disposed guide sheaves or pulleys 132, which are rotatably and freely journalled on vertical pins 134 depending from the leg portions 104 and 106 of the U-shaped frame 108.

As shown in FIG. 3, the cleats 24 of the traction track 20 are disposed so that they will engage the water with the pontoons floating on the water and, thus, the track will function as a propulsion means.

It is to be particularly noted that no modification or reconstruction of the conventional body structure, engine structure and operation, including the propulsion track, and the steering mechanism are necessitated or required in converting the snowmobile from its normal use as a vehicle for travel on snow-covered terrain into an aquatic vehicle for travel on water.

In making the changeover from a snowmobile to an aquaticmobile, the conventional snowskis are removed from the supporting spindles 38 and the pontoons are attached to the spindles by means of the spindle bolts 62 passing through the openings in the sides or upstanding flanges of the U-shaped mounting plates 66. The U-shaped frame 110 has its leg portions 104 and 106 fixedly fitted within the collars 100 and 102 on the sides of the body at the rear end portion thereof and the cable 86 and 88 are attached to the rudder with the cables extending from the links 80 alongside the sides of the body and being held out of engagement therewith by the sheaves 132 and then being directly carried in a frictionless manner by the sheaves 132 inwardly into their point of attachment to the rudder link 130 which is carried by the rudder arm 128.

It can be appreciated that the same steering mechanism is utilized because the occupant seated on the seat portion 18 can manipulate the handle bar 28 and rotate the steering shaft 26 so as to manipulate through the conventional steering linkage 30 the cables 86 and 88 and thereby move the rudder so as to control the direction or movement of the aquaticmobile as it moves on the water surface under the propulsion force of the track, which is powered by the engine (not shown) with the same operator controls for the engine being utilized for the aquaticmobile as are utilized for the snowmobile.

Accordingly, it can be easily understood that a most practical and inexpensive assembly has been provided whereby a conventional snowmobile may be converted into an aquaticmobile so that the same unit can be easily changed over for use on water instead of travel on snow. The changeover merely involves the removal of the conventional snowskis and the positioning of the pontoons which is a very simple and easy mechanical operation that does not require the use of any great degree of mechanical skill or any tools other than ordinary and common tools. When the snowmobile is in use as such, i.e. with the skis attached, there is no particular outward manifestation of its conversion ability, other than the fact that the collars 100 and 102 are provided on the sides of the body but these would not interfere with the operation of the vehicle as a snowmobile nor would they present any operating obstruction or mar the appearance thereof. And yet, when the skis are removed, the pontoons and rudder can be easily attached and the steering linkage can be hooked up for the rudder and the body will float and ride easily on the water and be propelled over the water by means of the endless propulsion track 20.

While the best known form of conversion of a snowmobile into an aquaticmobile has been disclosed herein, it is obvious that various changes in the specified arrangement may be made and it is equally obvious that the aquaticmobile, as such, can find year-round use, particularly in warmer climates, where there is no snow so that not only is there herein disclosed means for converting a snowmobile into an aquaticmobile but also the present invention comprehends the provision of an aquaticmobile, along the lines of the concept disclosed therein without regard to the fact that the body, drive and steering assembly may have other value in association with snowskis for producing a snowmobile.

What is claimed is:

1. In an automotive vehicle of the snowmobile type having a body provided with a seat portion and an engine enclosure within which an engine is operatively disposed and having an endless track with cleats running longitudinally along the underside of the body and powered by the engine and having a steering arrangement including a steering shaft disposed adjacent to the seat portion and spindles rotatably depending from the forward end portion of the body; the structural assembly whereby such vehicle is converted into an aquaticmobile comprising buoyant pontoons disposed longitudinally on opposite sides of the body and having front and rear end portions, means for mounting the pontoons to the spindles so that the pontoons are supported adjacent their front end portions by the body in attachment thereto, said spindles being rotatable relative to the pontoons and having steering links extending laterally therefrom, a frame removably carried by the rear end portion of the body and including a transverse section disposed rearwardly of the body, a rudder rotatably carried by the transverse section, flexible connecting elements connected between the steering links and the rudder for manipulating the rudder in response to movement of the steering shaft by the occupant seated on the seat portion and means carried by said frame for attaching the rear end portions of the pontoons to the body.

2. The invention of claim 1 wherein said front end portions of the pontoons have laterally inturned offset complementary portions which are disposed transversely in front of the body and means connecting said offset portions together in a relatively adjustable manner.

3. The invention of claim 2 wherein said front ends of the pontoons and their inturned front portions are tapered in a bow-like manner.

4. The invention of claim 1 wherein said means for mounting the pontoons to the spindles includes integrally associated bearing plates provided on the upper faces of the pontoons, U-shaped plates rotatably pinned in an upstanding manner to the bearing plates and said spindles having lower ends fitted within the ears of the U-shaped plates and spindle bolts joining the spindle lower ends to the ears.

5. The invention of claim 4 wherein said flexible connecting elements include cables joined to the spindle bolts, idler guide sheaves horizontally carried by the frame and around which the cables are guidingly entrained.

6. The invention of claim 5, wherein said frame is of U-shape and has opposing leg portions and a bight portion constituting said transverse section, mounting collars provided on the opposite sides of the body adjacent its rear end and within which the leg portions of the U-shaped frame are socketed, said transverse section being spaced rearwardly of the rear end of the body and means carried thereby for rotatably affixing the rudder thereto.

7. The invention of claim 6 wherein said last means is disposed in substantial alignment with the longitudinal center line of the body and includes a vertical collar, said rudder having a vertical rod rotatably fitted in the collar.

8. The invention of claim 7 wherein said rudder has a forwardly disposed horizontal upper end to which the steering cables are connected.

9. The invention of claim 1 wherein said pontoons are tapered outwardly toward their rear end portions and have outwardly and rearwardly inclined outer sides, said rear end portions being of a greater width-wise dimension than the front end portions.

10. The invention of claim 1 wherein said pontoons are disposed in relation to the cleated track and the underside of the body so that the cleats on the track engage the water as the pontoons support the body on the water whereby the track functions as the propulsion means.

References Cited

UNITED STATES PATENTS 3,215,114  11/1965  Jenkins _____ 115—1
3,474,751  10/1969  Hebert _____ 115—1

ANDREW H. FARRELL, Primary Examiner